July 6, 1965     L. REYMOND     3,192,841
TELEMETER VIEW-FINDER
Filed March 19, 1962

United States Patent Office 3,192,841
Patented July 6, 1965

3,192,841
TELEMETER VIEW-FINDER
Lucien Reymond, Paris, France, assignor to Societe d' Optique et de Mecanique de Haute Precision, Paris, France, a company of France
Filed Mar. 19, 1962, Ser. No. 180,744
Claims priority, application France, Mar. 28, 1961, 857,079
6 Claims. (Cl. 95—64)

The invention relates to a telemeter view-finder comprising photo-electric cells for adjusting the diaphragm aperture of a photographic objective.

There are known types of view-finders coupled to still photographic or cinematographic objectives in which there is a telemeter device enabling the said objectives to be correctly focussed by producing coincidence between two images which form along a separating line. Such systems are described in particular in French Patents Nos. 1,150,544 and 1,252,714 filed by the applicants on May 11, 1956, and December 21, 1959, respectively. Acting by reflection in the path of the beam passing through the photographic objective, these view-finders abstract two small portions sufficiently remote from one another so as to direct the corresponding light towards the objective of the view-finder, for which the two small light-abstracting reflecting surfaces act as two distinct inlet apertures.

The invention concerns such a type of view-finder, and relates to a telemeter view-finder comprising photo-electric cells for adjusting the diaphragm aperture of a photographic objective, the said view-finder comprising a sighting objective, at least one double prism on to the intersection angle of which may be brought the plane of the true image formed by the sighting objective, a carriage in at least two parts separated by an air-space, and an eye-piece, inlet apertures being provided in front of the sighting objective and the images of the said apertures being combined into a single true axial image in the space separating the two parts of the carriage, the said view-finder being characterised in that means are disposed in the path of the light rays forming redundant non-axial true images of the inlet apertures of the sighting objective, the said means picking up the light in order to adjust the diaphragm aperture of the photographic objective by means of photo-electric cells.

The invention will now be described with reference to some forms of embodiment which are given by way of example and illustrated in the drawings.

Figure 1:
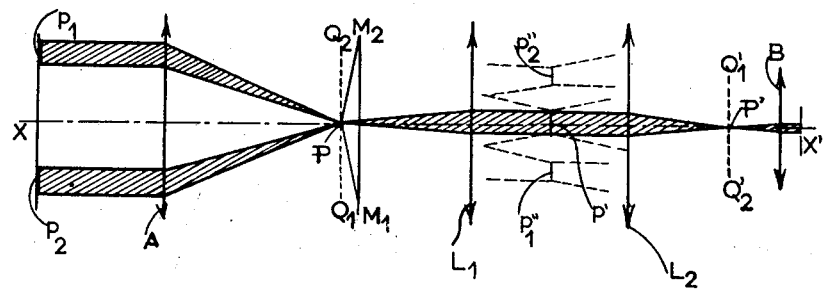
FIGURE 1 is a diagram of a view-finder according to the invention.

FIGURE 1 diagrammatically illustrates a form of embodiment of the invention in which the view-finder comprises a sighting objective A in front of which there are two inlet apertures $p1$ and $p2$.

The pencils of rays from the object point situated on the optical axis of the view-finder form an image at the point P in the plane Q1 P Q2 perpendicular to the optical axis XX of the view-finder.

The view-finder also comprises a double prism M1 P M2 which, when the photographic objective is correctly focussed, has its intersection angle P in the plane of the image situated at Q1 P Q2.

The double prism M1 P M2 practically constitutes two deflector prisms P M1 M2 and P M2 M1, joined by their bases.

Behind the double prism there is a carriage made up of two converging lenses L1 and L2 separated by an air-space.

The image of the object under observation forms in the plane Q'1 P' Q'2, behind the carriage.

The eye-piece B is so placed that its object focus coincides with the point P'. The rays therefore emerge parallel to the optical axis after the eye-piece B.

Some of the pencils of light which have passed through the double prism and serve to form the final image observed in the view-finder emanate from the image of the aperture $p1$ which passes through the unit made up of the objective A and the prism P M1 M2, and they concern the points of the field which form their images on the side PQ1 of the intersection angle projected at P; the others emanate from the image of the aperture $p2$ through the unit made up of the objective A and the prism P M2 M1, and they concern the points of the field which form their images on the side PQ2 of the intersection angle projected at P. The images of these two apertures $p1$ and $p2$ combine into a single image $p'$, which is a true image and is situated on the optical axis XX' of the view-finder between the lenses L1 and L2, this image $p'$ being a constricted section of the whole beam made up of all the rays which participate in the formation of the complete image observed through the view-finder.

In particular, and without this overall arrangement limiting the possible uses, the arrangement shown in FIGURE 1 may be used, the inlet apertures $p1$ and $p2$ being disposed in the front focal plane of the objective A, so that, after having passed through the prisms P M1 M2 and P M2 M1, the images of these apertures previously mentioned are combined at infinity in the direction of the optical axis XX'. In addition, the front focal plane of the lens L1 combines with the image-plane Q1 P Q2, and its rear focal plane coincides with the front focal plane of the lens L2. In this case, the image $p'$ of the two apertures $p1$, $p2$ forms in this common plane, and the image-plane Q'1 P' Q'2 is disposed in the rear focal plane of the lens L2 which coincides with the front focal plane of the eye-piece B.

In the view-finder which has just been described, if it is assumed that on the one hand the pencils of rays from the aperture $p1$ correspond to object-points which form their images on the side PQ2 of the intersection angle P, and on the other hand that the pencils of rays from the aperture $p2$ corresponds to object-points which form their images on the side PQ1 of the intersection angle P, which has the effect this time of associating the aperture $p1$ with the prism P M2 M1 and the aperture $p2$ with the prism P M1, M2, which combinations are opposite to those previously considered, it will be seen that any deflections respectively imparted to these pencils by the prisms through which they pass occur in opposite directions to those which caused the images of the apertures $p1$, $p2$ to combine on the optical axis XX' of the view-finder. It follows from this that, after having passed through the lens L1, the images of the apertures $p1$, $p2$ corresponding to this combination form at $p''1$ and $p''2$ respectively in the same frontal plane as $p'$. The space separating $p''1$ and $p''2$ is double what there would be if the flat prism P M1 M2 were eliminated, in which case the image $p'$ would be eliminated. Through each of these images $p''1$ and $p''2$ of the apertures there passes a beam of rays whereof each corresponds to half the total field observed in the viewfinder, these two halves being complementary to one another so that together they re-constitute the complete field as obtained by way of the whole beam from the impage $p'$ situated on the optical axis. These half-beams, passing through $p''1$ and $p''2$ respectively, constitute redundant light which cannot be used for observation through the view-finder, and which could be eliminated by placing in the plane containing $p'$, $p''1$ and $p''2$ a screen pierced only with a central aperture which allows only the light from $p'$ to pass.

The subject of the present invention is a view-finder of the type described wherein the rays making up the redundant aperture images which are made true are picked up, for example, by cells of small dimensions whereof the sensitive surfaces are disposed sufficiently close to the said aperture images. These cells serve to actuate members such as galvanometers producing deflections which vary as a function of the quantity of light received, so as to be capable of actuating the vanes of the diaphragm so that the latter assumes the aperture corresponding to the greater or lesser degree of brightness of the subject to be photographed or filmed.

In order to prevent the cells from obstructing part of the central beam passing through $p'$, it may be advantageous to use small mirrors or small prisms to impart lateral deflection to the beams from the aperture images $p''1$ and $p''2$, so that the cells are disposed outside the view-finder.

Figure 2:
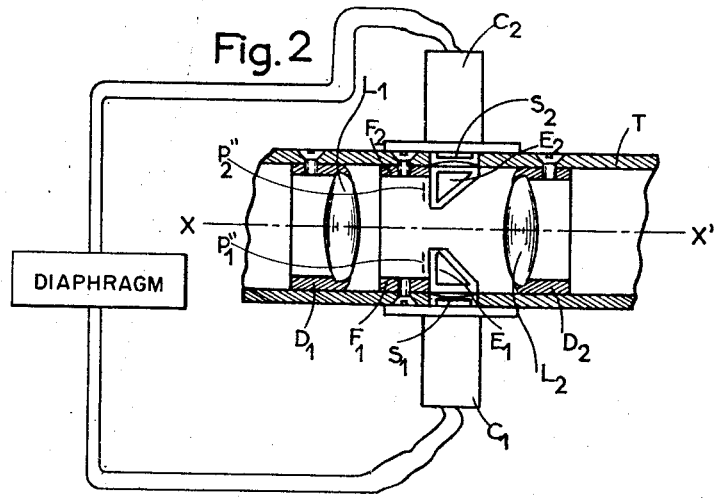
FIGURE 2 is a more detailed longitudinal section through the carriage of the view-finder, in one particular form of embodiment.

An example of such an embodiment is illustrated in FIGURE 2, which is a longitudinal part-section passing through the optical axis XX' of the view-finder and limited to that part of the tube T of the view-finder in which are fitted the two moving lenses L1 and L2, the latter being crimped in the mountings D1 and D2 of the tube T. In the vicinity of the aperture images $p''1$ and $p''2$ there are the small prisms E1, E2 held on the mountings F1, F2 which are fixed inside the tube T, these prisms returning perpendicularly to the optical axis XX' of the view-finder the beams emanating from $p''1$ and $p''2$ respectively which are received by the sensitive surfaces S1 and S2 of the cells C1 and C2, these latter being fixed to the external wall of the tube T.

The said small return mirrors or prisms may also be suitably oriented so that the beams which they laterally deflect mix on the sensitive surface of a single cell.

Figure 3:
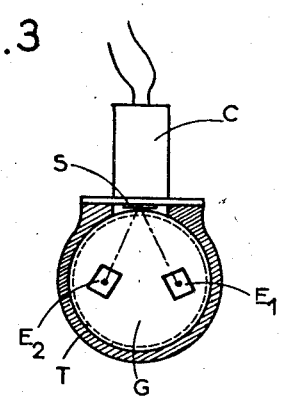
FIGURE 3 is a section through the carriage of the view-finder in a plane perpendicular to the optical axis, showing a variant of embodiment.

Such a variant is illustrated in FIGURE 3. This is a transverse part-section of the tube T in which the return prisms E1, E2 are cemented to a transparent plate G (made of glass for example), fixed inside the tube T of the view-finder, so that the said plate allows the central beam to pass, and the prisms E1, E2 are so oriented that the beams which they deflect are directed on to the sensitive surface S of a single cell C fixed outside the tube T. Consideration might also be given to the idea of the transparent plate G and the two prisms E1, E2 being made up in the form of a single-piece moulding.

The invention is naturally not limited to the examples cited, and may just as well be used with view-finders comprising various combinations of flat prisms functioning with more than two inlet apertures, with a corresponding greater or lesser number of redundant aperture images.

What I claim is:
1. In a telemeter view-finder for a photographic objective having a diaphragm with an adjustable diaphragm aperture for the objective, a sighting objective, at least one double prism, an intersection angle for said prism located in the plane of the true image formed by said sighting objective, a two part carriage separated by an air space, an eye-piece, inlet apertures in front of said sighting objective, the images of said apertures being combined into a single true axial image in said air space, and means in the air space disposed in the path of the light rays forming redundant non-axial true images of said inlet apertures for receiving said light rays in order to adjust the diaphragm aperture of the photographic objective said means including at least one photoelectric cell electronically connected to said diaphragm.

2. A telemeter view-finder as described in claim 1 including reflecting surfaces which turn the light rays into said photoelectric cell.

3. A telemeter view-finder as described in claim 1 including reflecting surfaces in said air-space which turn the light rays into said photoelectric cell.

4. A telemeter view-finder as described in claim 1 including reflecting surfaces which turn the light rays into said photoelectric cell, a transparent flat sheet and parallel faces on said sheet, the light rays passing through said sheet, and said sheet supporting said reflecting surfaces.

5. A telemeter view-finder as described in claim 1, said carriage including at least two lenses separated by said air space.

6. A telemeter view-finder as described in claim 5, said inlet apertures being located in the object focal plane of said objective providing a true image at said intersection angle of said double prism, said lenses on said carriage being afocal, a first lens in said carriage having an object focus disposed in the plane of the image of said sighting objective when the focus is correct, a second lens in said carriage having an image focus and said eye-piece having an object focus which coincides with the image focus of said second lens.

References Cited by the Examiner

UNITED STATES PATENTS

| 1,993,084 | 3/35 | Brewer. | |
|---|---|---|---|
| 2,058,532 | 10/36 | Tuttle | 95—64 X |
| 2,360,256 | 10/44 | Mihalyi | 95—64 X |
| 2,655,848 | 10/53 | Gray | 95—64 |
| 2,659,268 | 11/53 | Grand | 95—42 X |
| 3,006,262 | 10/61 | MacMillin | 95—64 |

FOREIGN PATENTS 1,209,793  9/59  France.

NORTON ANSHER, *Primary Examiner.*
DELBERT B. LOWE, *Examiner.*